Patented July 30, 1935

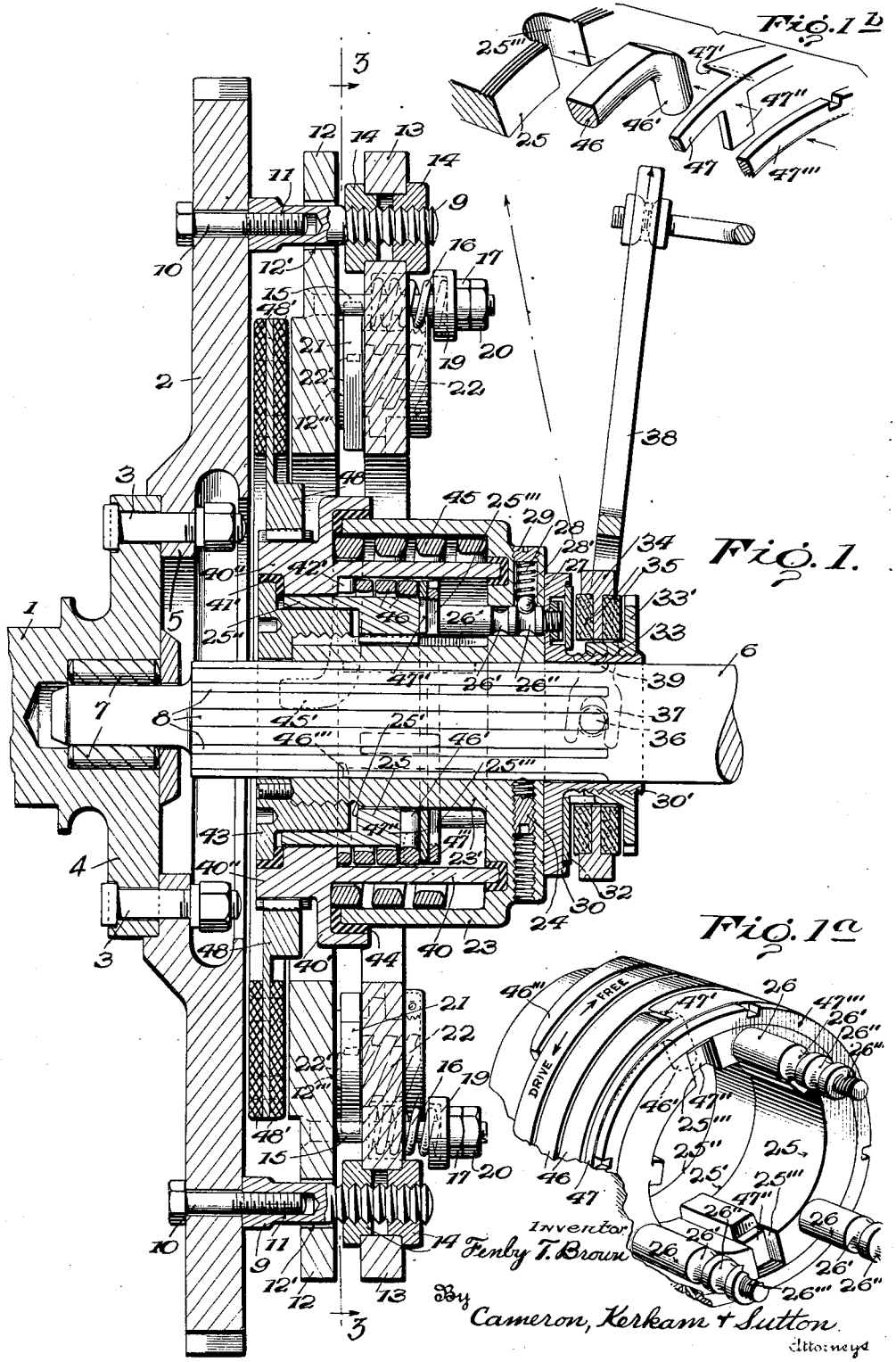

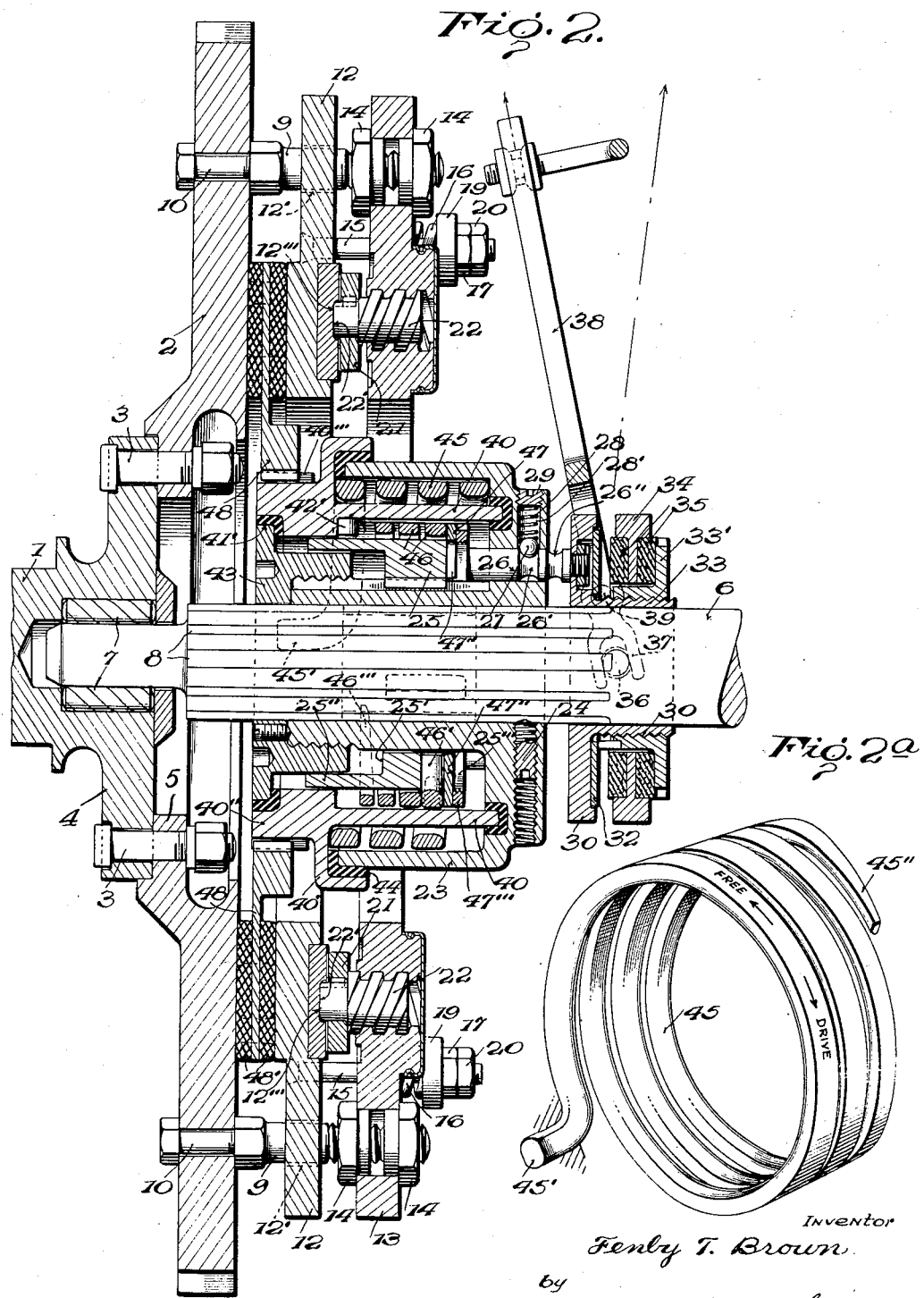

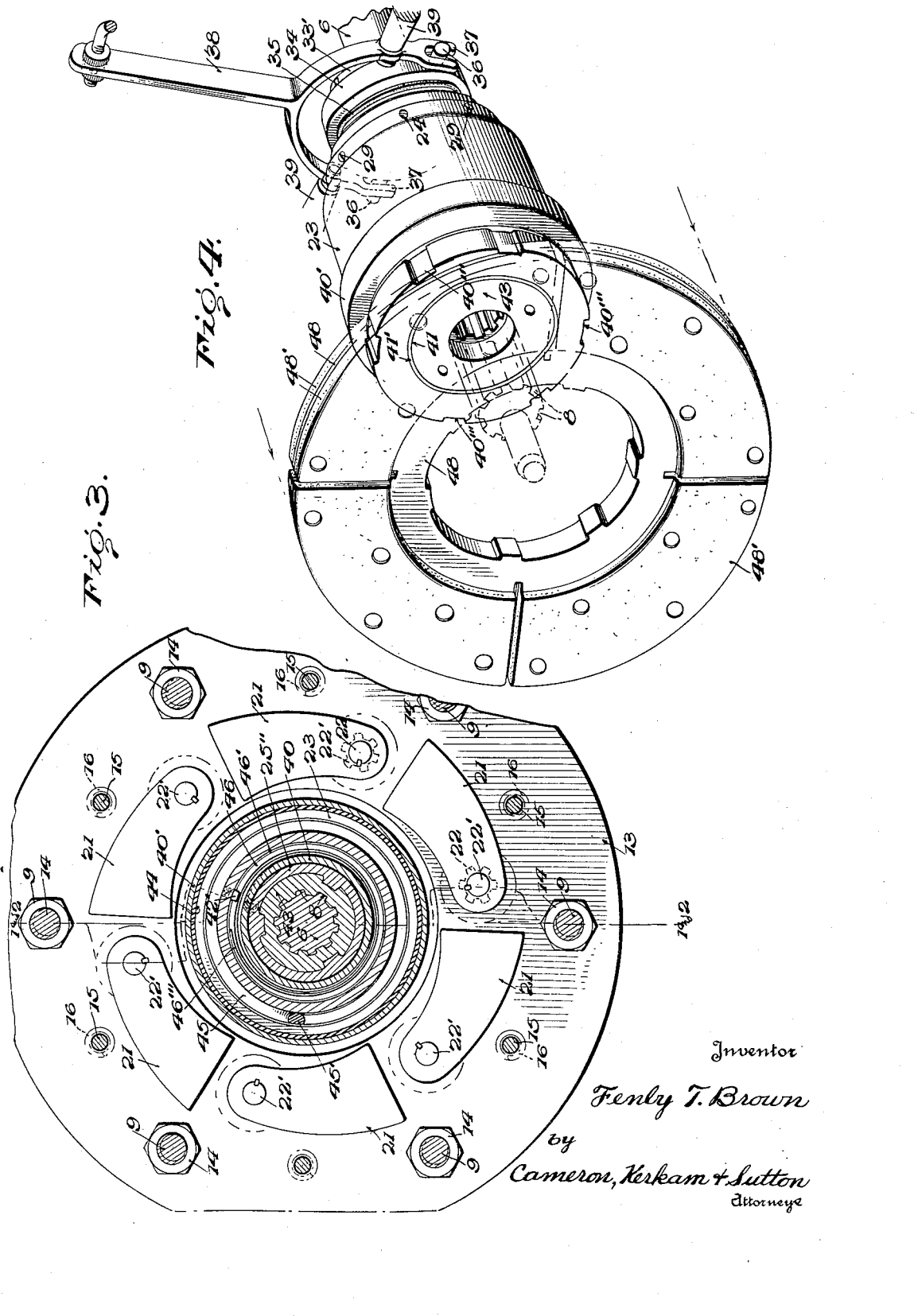

2,009,914

UNITED STATES PATENT OFFICE 2,009,914

FREE-WHEELING CLUTCH FOR AUTOMOBILES

Fenby T. Brown, Baltimore, Md., assignor to Investors Industries, Inc., Baltimore, Md., a corporation of Maryland Application July 27, 1931, Serial No. 553,422
Renewed May 2, 1935

5 Claims. (Cl. 192—48)

This invention relates to clutch mechanism for connecting a driving part to a driven part, such for example as the motor shaft of an automobile to the driven shaft thereof, and more particularly the invention relates to a clutch of this character designed to disconnect the driven from the driving shaft when the speed of the former tends to overrun or exceed that of the latter, a condition technically known as free-wheeling.

It is a recognized fact that free-wheeling may become dangerous (as on steep grades) unless means are provided whereby the driving or motor shaft of the vehicle can be readily reconnected with the driven shaft at the will of the operator, to the end that the motor may act as a brake, or resist the tendency of the vehicle, and hence the driven shaft, to move at an excessive speed. In constructions heretofore in use this braking action of the motor has resulted in severe strain upon the parts with consequent depreciation of the machine as a whole.

One of the objects of the present invention is to provide a free-wheeling clutch of simple construction which, at the will of the operator, may be caused to operate as a free-wheeling clutch, and which otherwise, at the will of the operator, may, when free-wheeling, be caused to readily reconnect the driven and the driving shafts, to the end that the motor may be employed as a brake, and without any severe strain or shock on the mechanism.

A further object is to provide a clutch of this character whereby the shift may be made from motor driven to free-wheeling action, the motor, during free-wheeling may be thrown in as a brake, and all without any shifting of gears. A still further object of the invention is to provide a clutch of this character whose parts are so constructed and arranged that they may be readily substituted for the clutch parts in a great majority of automobiles now in use, and this at a minimum cost.

With these objects in view, the invention consists in a construction and arrangement of parts of a clutch mechanism one form of which is illustrated in the accompanying drawings, but it is to be expressly understood that such drawings are for the purpose of illustration only, and are not designed to define the limits of the invention, reference being had to the appended claims for this purpose.

In said drawings:

Fig. 1 is a vertical section on the line 1—1 of Fig. 3 showing the parts in free-wheeling position with the driven shaft and certain other parts in elevation;

Fig. 1a is a broken perspective of the free-wheeling control;

Fig. 1b is a broken perspective detail of parts anchoring the spring shown in Fig. 1a;

Fig. 2 is a section on the same line as Fig. 1, but with parts broken away to show centrifugally actuated parts;

Fig. 2a is a perspective of the main clutch spring;

Fig. 3 is a section taken on the line 3—3 of Fig. 1 looking in the direction of the arrows;

Fig. 4 is an expanded perspective view of the internal portion of the clutch mechanism, particularly the splined connection thereof with the friction member of the clutch.

Figure 5:
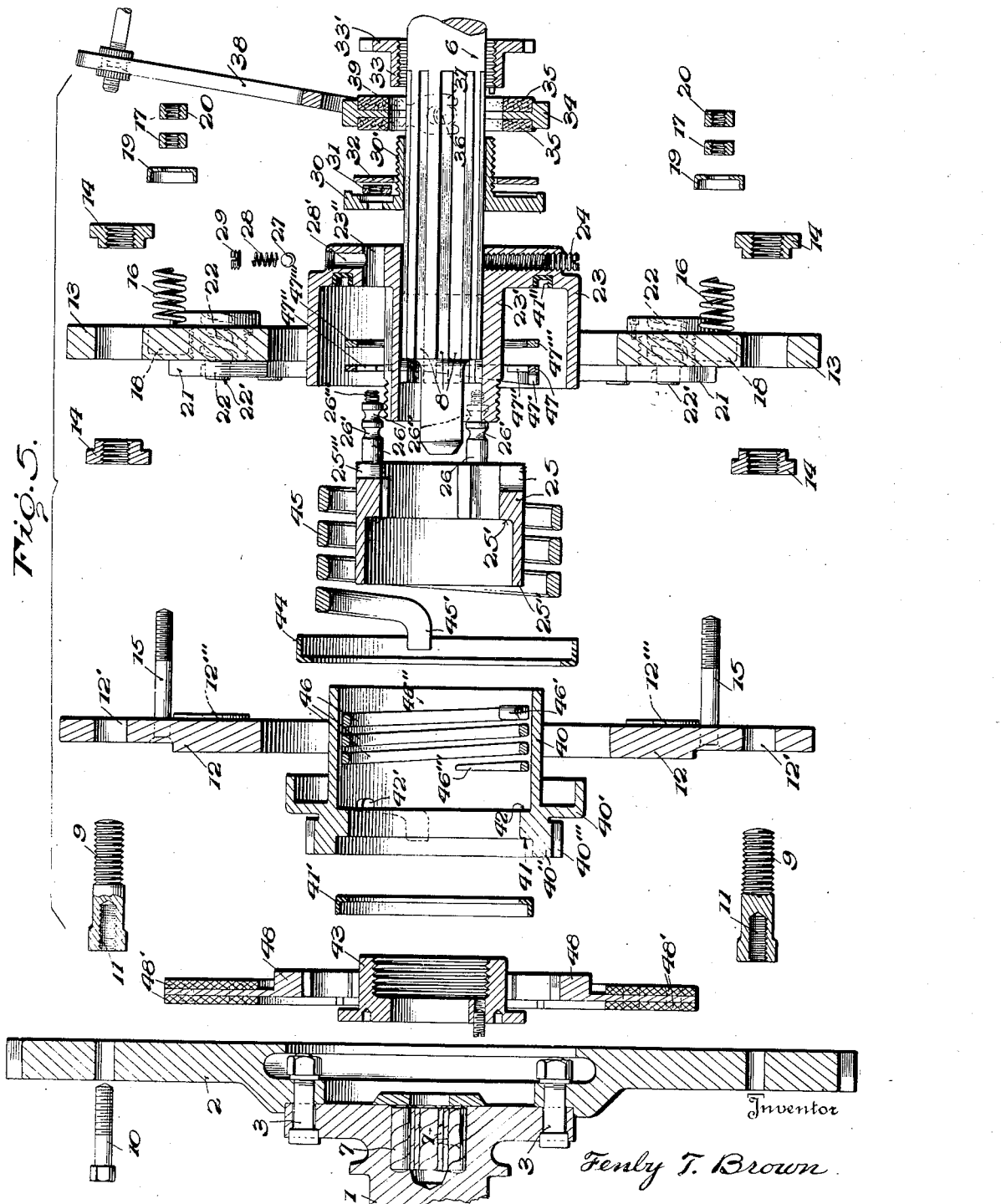
Fig. 5 is an expanded or exploded view of the parts of the clutch in section.

Referring to the drawings, in which like reference characters refer to like parts throughout the several views, 1 indicates a driving shaft connected in any way to a suitable motor, and 2 indicates a flywheel secured to the end of said shaft 1, as by bolts 3, 3 extending through a peripheral flange 4 on the shaft 1 and an interior annular flange 5 formed on the flywheel 2. The driven shaft 6 takes bearing at 7 in the end of the driving shaft 1, said driven shaft being splined as shown at 8 for a purpose hereinafter to be explained.

Mounted on the side of the flywheel 2 opposite to the shaft 1 are a plurality (here shown as 6) of screw threaded pins 9, said pins being firmly secured to the flywheel by means of bolts 10 passing through the flywheel and into screw threaded sockets 11 formed in the bolts 9. An annular disk 12 is mounted to slide freely upon pins 9 which pass through corresponding openings 12' in said disk, and on the exterior screw threaded ends of the pins 9 there is mounted an annular disk 13 having openings therein through which said pins pass, the disk 13 being adjustably, but rigidly, secured to the pins 9 by nuts 14 screw threaded on the pins 9, said nuts being provided with bosses which enter the openings in the disk 13 and with flanges which engage the opposite faces of the disk. It will be seen that by this construction the disk 13 is rigidly, but adjustably, secured to the flywheel 2, and through the flywheel is driven by the shaft 1, and that the disk 12 is also driven by the shaft 1, but is free to move toward and from the flywheel by reason of its sliding action on said pins 9.

Headed pins 15 pass through the disk 12 and the disk 13 and are surrounded by springs 16 (Figs. 1 and 5) which react between the disk 13 and nuts 17 screw threaded on the ends of the pins 9. Preferably the said springs 16 are seated in depressions 18 formed in the disk 13, as shown in dotted lines in Figs. 1 and 5, and preferably also a bearing cap 19 is interposed between the nut 17 and the outer end of the spring and a lock nut 20 is placed on the pin 15 exterior to the nut 17. This construction of parts provides means to adjust the tension of the springs 16, and hence to determine the position of the disk 12 with relation to the disk 13.

The disk 13 has mounted thereon on the face adjacent to the disk 12 a plurality (here shown as 6) of centrifugally actuated weights 21, said weights being so mounted that when they are thrown outward under the influence of centrifugal force, they will move the disk 12 away from (or from right to left as shown in Fig. 1) the disk 13. With this end in view, the weights 21 are keyed to screw threaded shafts 22 (Fig. 2), which shafts pass through nuts mounted or formed in the disk 13, to the end that when said weights 21 are thrown outward by centrifugal force, the bearing ends 22′, see Fig. 5, will contact with bearing surfaces 12‴ formed on the disk 12, and force the disk 12 away from (or from right to left as shown in Fig. 1) the disk 13, this action taking place against the tension of the springs 16. When the centrifugal force throwing the weights outward is sufficiently diminished, the action of the springs 16 is to move disk 12 toward the disk 13 and return the centrifugal weights to their normal position.

All of the parts thus far described, with the single exception of the driven shaft 6, are connected to and move with the flywheel 2.

Surrounding the splined portion of the driven shaft 6 is a cup-shaped member 23 having an axial sleeve 23′ preferably formed integrally therewith, which sleeve is splined on the driven shaft 6 so as to be adjustable therealong, and the cup and sleeve are fixed in adjusted position by means of a set screw 24. Splined on the sleeve 23′, and within the cup 23, is a sleeve 25 (Figs. 1, 1a, 2 and 5) having an interior annular shoulder 25′ and an exterior annular shoulder or end 25″. This sleeve 25 has a pin-like member 26 formed integral therewith, or otherwise secured thereto, which pin is provided with two circumferential grooves 26′ and 26″. This pin 26 has a screw threaded end 26‴ which projects through an opening 23″ in the member 23, and a spring-pressed ball 27 is mounted in a channel 28 formed in the member 23, which channel extends to the opening 23″ and at right angles thereto. The spring bearing on the ball 27 is placed under compression by a screw plug 29, and when the parts are in assembled position (Figs. 1 and 2) acts to force the ball into one or the other of the grooves 26′, 26″. A ring 30 is slidably mounted on the shaft 6 adjacent the cup-shaped member 23 and the screw threaded end 26‴ of the pin 26 extends through an opening in said ring and receives a nut 31, thus securing the ring 30 to the pin 26, and through said pin to the sleeve 25. Preferably the nut 31 is countersunk in the face of the ring 30, as shown, and an annular plate 32 fits with countersunk shoulders formed in the face of the ring 30 (Figs. 1 and 5). The ring 30 has an exteriorly screw threaded sleeve 30′ formed therewith, which sleeve surrounds and extends along the shaft 6, and screw threaded on said sleeve 30′ is a flanged sleeve 33 so proportioned that when the parts are united there is an annular space between the plate 32 and the flange 33′ of the sleeve 33, as clearly shown in Fig. 1. Within this annular space is mounted a ring 34 preferably provided with antifrictional bearing faces 35, and said ring is provided with two oppositely-disposed, radially-projecting pins 36 (Fig. 4), which are engaged by the forked ends 37 of a lever 38 fulcrumed at a point 39, shown in dotted lines in Figs. 1 and 5 and in full lines in Fig. 4. By manually shifting the lever 38 it will readily be seen that the sleeve 25 will be thrown to the left or the right, as shown in the drawings, the ball 27 yielding to permit such movement, and when shifted, the sleeve will be held in shifted position by engagement of the ball 27 in one or the other of the grooves 26′, 26″.

A cylinder 40 extends into the cup-shaped member 23 in its open side, that is the side adjacent the flywheel, the inner end of said cylinder bearing against the bottom of the cup-shaped member 23, preferably by entering an annular groove formed in the bottom of said cup-shaped member, which groove is preferably provided with a bearing surface 41″ of bronze metal, and preferably also the cylinder 40 has a cup-shaped flange 40′ formed in its left-hand portion, as shown in Figs. 1 and 5, and, projecting from said flange 40′ toward the flywheel, a portion 40″ having splines 40‴ formed on the periphery thereof. This portion 40″ is also provided with an annular interior shoulder 41 and the internal diameter of the portion 40″ is such as to provide a shoulder 42 opposite the shoulder 41. Preferably there is seated against the shoulder 41 a ring 41′ of bronze metal. A flanged nut 43 is screw threaded onto the sleeve 23′ of the cup-shaped member 23 with the interior end of the nut extending nearly, but not quite to, the shoulder 25′ of the sleeve 25, and with the flange of the nut bearing against the shoulder 41 on the cylinder 40 or against the ring 41′ of the shoulder, when said ring is employed. Thus nut 43 serves to secure all of the parts together with the rim of the cup-shaped member 23 bearing against the flange 40′ of the cylinder 40, preferably through the medium of a ring 44, L-shaped in cross section and of bronze metal resting in said cup-shaped flange, as will be readily understood from an inspection of Figs. 1 and 5. The diameters of the cup-shaped member 23, the sleeve 25 and the cylinder 40 are such that when the parts are thus assembled, an annular space is left between the interior wall of the cup-shaped member 23 and the exterior wall of the cylinder 40, and between the interior wall of the cylinder 40 and the exterior wall of the sleeve 25. Within the annular space between the members 23 and 40 there is mounted a coiled spring 45 having its left-hand end, 45′, as shown in Figs. 1, 2, 5, that is the end adjacent the flywheel, anchored to the flange 40′ of the cylinder 40. The opposite or right-hand end 45″ of the spring 45 is gradually tapered and bears against the bottom of the cup-shaped member 23. Preferably this spring in cross section is shaped, as shown in the drawings, that is, with that part adjacent the interior wall of the cup 23 forming a plane surface, while that portion adjacent the exterior wall of the cylinder 40 is arc-shaped. In the annular space between the sleeve 25 and the cylinder 40 there is mounted a coiled spring 46 materially lighter or of less strength than the spring 45 and having its right-hand end, as shown in Figs. 1, 1a, 1b, and 5, that is the end adjacent the shoulder 25′ on the sleeve 25, anchored to said ring by the bent end 46' thereof entering a recess 25''' in the sleeve 25. The end of the spring is held in such anchored position by a ring 47 having a shoulder 47' and an inwardly extending lug 47'', as will be clearly understood from an inspection of Figs. 1a and 1b. The ring 47 is held in place by a second ring 47''' screwed on the sleeve 25. This spring 46 preferably tapers from its anchored end to the other end thereof which is free, which free end 46''' rests upon the shoulder 42 of the cylinder 40. The interior wall of the cylinder 40 is preferably provided close to the shoulder 42 with an abutment or stop 42', Fig. 5, and when there is relative rotation between the cylinder and spring in one direction the tapered end 46''' slides freely over said abutment, but rotation in the reverse direction causes the spring end 46''' to engage said abutment and tend to unwind the spring.

Splined to the projecting portion 40'' of the cylinder 40 is a friction disk 48 positioned between the annular disk 12 and the flywheel 2, and preferably provided with friction surfaces 48' on the opposite sides thereof, one in close proximity to the disk 12, and the other in close proximity to the flywheel 2, but out of engagement therewith when the parts are in their normal or inoperative positions. It will be observed that the disk 48 is free to slide on the splines 40''' of the part 40'', but, by reason of the splined engagement, the cylinder 40 must revolve with the disk 48.

*Operation.*—When all of the parts are in their normal position, that is, with the motor and the machine at rest, and the lever 38 is in the position shown in Fig. 2, the sleeve 25 is in its outward position, the ball 27 rests in the groove 26' of the pin 26 and the spring 46 is not under compression. The centrifugal weights 21 are in their innermost positions shown in Fig. 3. When the engine is started and attains sufficient speed to throw the weights 21 outward under centrifugal action, the screw threaded shafts 22 move inward through the disk 13 and cause the ends 22' of the shafts 22 to bear against the surfaces 12''' of the disk 12. This disk 12, being free to move on the pins 11, is thus forced into engagement with the friction surfaces of the friction disk 48, and by reason of the splined connection of said friction disk 48 with the projecting portion 40'' of the cylinder 40, said friction disk is forced toward and into contact with the face of the flywheel 2 and is thus gripped between the disk 12 and the flywheel. Since the friction disk 48 is splined to the cylinder 40, and the spring 45 is anchored at one end to said cylinder the two revolve with the disk and in clockwise direction. The friction of the tapered end 45'' of said spring 45 upon the base of the cup-shaped member 23 tends to unwind the spring 45, thus slightly increasing its diameter and throwing it into clutching engagement with the inner wall of the cup-shaped member 23, and, since this cup-shaped member is splined to the shaft 6, said shaft is thereby set in revolution. The sleeve 25 being splined to the interior sleeve portion 23' of the cup-shaped member 23, revolves with said member and the shaft 6, and the spring 46 being anchored to the ring 25 revolves therewith. But since this spring is wound in a direction the reverse of that of spring 45, and since the tapered end 46''' thereof is free to slide freely over the abutment 42' when the parts are revolved clockwise, and moreover, since the spring 46 is not under compression when the sleeve 25 is moved outward, as shown in Fig. 2, the spring 46 simply idles. It will be observed that the more rapidly the motor revolves the flywheel 2, the greater will be the centrifugal force due to the weights 21, and hence the more efficient gripping of the friction disk 48 between the disk 12 and the face of the flywheel, and hence the more efficient clutching action of the spring 45 on the interior wall of the cup-shaped member 23. This results in an absence of that slip which frequently occurs in clutches when the speed of the motor or the weight of the load is increased.

If now the operator removes his foot from the accelerator of the motor and the machine moves forward under its own momentum, the driven shaft 6 will overrun the motor, the centrifugal weights will be returned to their inner position, moving outward on the plate 13, and frictional engagement between the disk 12 and the flywheel 2 with the friction disk 48 is released. Thus all driving connection between the motor and the shaft 6 is released and the machine is in the condition technically known as free-wheeling. Under these conditions the speed of revolution of the cup-shaped member 23 exceeds that of the cylinder 40 to which the spring 45 is anchored, and releases the spring from its gripping action on the interior wall of the cup-shaped member 23, so that there is at the most only a gently slipping contact between the spring and the wall of the cup. The spring 46 is not under compression and merely idles within the cylinder 40. Now, if it is desired to bring the motor in as a brake while the machine is thus free-wheeling, the lever 38 is shifted from the position shown in Fig. 2 to that shown in Fig. 1. This places the spring 46 under compression by reason of the sleeve 25 being forced inward (to the left in Figs. 1 and 2) in which position it is retained by the engagement of the ball 27 in the groove 26'' of the pin 26. Under these conditions the tapered end 46''' of the spring 46, either by reason of its frictional engagement with the shoulder 42 of the cylinder 40, or in positive engagement with the abutment 42', when such abutment is employed, is caused to tend to unwind and thus effect clutching engagement with the interior wall of the cylinder 40, the revolution of which cylinder throws the spring 45 into gripping engagement with the interior wall of the cup 23. In this condition it will be observed that the friction disk 48 is not in frictional engagement with the disk 12 or the flywheel. If now the operator gently accelerates the motor sufficient to throw the centrifugal weights 21 outward, the disk 12 will be forced down against the friction disk 48, and the latter in turn will be forced into frictional engagement with the flywheel 2, and the revolutions of the shaft 6, due to its free-wheeling momentum, will necessarily take place against the resistance of the motor, and the latter acts as a brake on the movements of the vehicle.

It should be observed however that if desired the motor, during free-wheeling, may first be accelerated and the lever 38 then shifted from the position shown in Fig. 2 to that shown in Fig. 1, and thus bring the motor in as a brake.

It will be observed that the acceleration of the motor need only be sufficient to cause the centrifugal weights to act to cause the disk 12 and the flywheel 2 to grip the disk 48. The motor need not be moving at high speed. This is a matter of great importance. In all free-wheeling structures heretofore proposed, when the car is free-wheeling and it is desired to reconnect the motor, the driver accelerates the motor. But with the motor as ordinarily used acceleration thereof occurs when a load is on the motor. In free-wheeling, however, there is no load on the motor, and when the driver accelerates the motor during free-wheeling, unless he does it with great care, (in other words, if he proceeds as he ordinarily does for acceleration) the motor speeds up to a speed above that of the free-wheeling parts, and when the motor positively connects up with the gears it does so with a bang. This inevitably puts a destructive strain on the parts, and in time is almost certain to break the same. As contra-distinguished from this action, it will be observed that the clutch of the present invention brings the motor and the driven parts into positive connection when the motor has been accelerated to a very low and predetermined speed, with the result that the motor takes hold gently and without abnormal strain on the parts.

With the motor thus thrown in as a brake, free-wheeling can be immediately resumed by the operator merely shifting the lever 38 and taking his foot off the accelerator. On the other hand, if it is desired to shift from free-wheeling position to the ordinary driving position of the parts, lever 38 is shifted from the position shown in Fig. 1 to that shown in Fig. 2, and the motor accelerated. This may be done without regard to whether the driving parts of the vehicle are in high, low, or intermediate gear. Even in high gear, with the car standing still and the motor running at low speed, the car may be started by gently accelerating the motor to a speed necessary to throw the centrifugal weights 21 into the outermost position and the clutch takes hold and the car moves off slowly, and can be caused to move with constantly increasing speed by merely increasing the acceleration of the motor.

What is claimed is:

1. In a free-wheeling clutch, the combination of a driven shaft and a driving shaft, a cylinder mounted on the driven shaft and free to have rotative movement relative thereto during free-wheeling, a compressible coiled spring within said cylinder and connected at one end to and revolving with the driven shaft, means for placing said spring under compression, clutch mechanism for connecting said cylinder with the driving shaft, and means in the path of the free end of said spring when and only when under compression for expanding said spring into clutching engagement with said cylinder, whereby during free-wheeling the motor may be connected to act as a brake by compressing said spring.

2. In a clutch, the combination of a driven and a driving shaft in axial alinement, a sleeve slidable longitudinally on the driven shaft and having a compressible coiled spring surrounding the same and anchored thereto, a cylinder surrounding said sleeve, an abutment on said cylinder in the path of the free end of the spring when and only when compressed, a clutch member operatively connected to said cylinder, a clutch member on the driving shaft, and automatic means surrounding said cylinder for bringing said clutch members into clutching engagement at a predetermined speed of the driving shaft.

3. The combination of a driven shaft, a cylindrical member fixed on said shaft, a sleeve slidably mounted on said shaft to revolve therewith, a second cylinder within the first-named cylinder and surrounding said sleeve, a coiled spring in the annular space between the two cylinders, a compressible coiled spring in the annular space between the inner cylinder and said sleeve, said compressible spring being wound in a direction reverse to that of said first-named spring, means for compressing said last-named spring at the will of the operator, an abutment on said inner cylinder in the path of the free end of said compressible spring when and only when the same is compressed, and means connecting said inner cylinder with a driving member at the will of the operator.

4. The combination of a driven shaft, a cylindrical member fixed on said shaft, a sleeve slidably mounted on said shaft to revolve therewith, a second cylinder within the first-named cylinder and surrounding said sleeve, a coiled spring in the annular space between the two cylinders, a compressible coiled spring in the annular space between the inner cylinder and said sleeve, said compressible spring being wound in a direction reverse to that of said first-named spring, means for compressing said last-named spring at the will of the operator, an abutment on said inner cylinder in the path of the free end of said compressible spring when and only when the same is compressed, and automatic clutch mechanism connecting said inner cylinder to a driving member at a predetermined speed of the latter.

5. In a clutch, the combination of a shaft, a shouldered cylinder, a sleeve slidably mounted on said shaft to revolve therewith within said cylinder, a coiled spring in the annular space between said cylinder and sleeve and anchored to the latter, means imparting sliding movement to said sleeve whereby said spring may be compressed or freed from compressions, and an abutment within said cylinder and in the path of the free end of said spring when and only when compressed, whereby said parts may be rendered operative and inoperative as a clutch at the will of the operator.

FENBY T. BROWN.